US006737012B2

United States Patent
Nakano et al.

(10) Patent No.: US 6,737,012 B2
(45) Date of Patent: May 18, 2004

(54) POWDER FOR MAGNETIC FERRITE, MAGNETIC FERRITE, MULTILAYER FERRITE COMPONENTS AND PRODUCTION METHOD THEREOF

(75) Inventors: Atsuyuki Nakano, Tokyo (JP); Isao Nakahata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/329,714

(22) Filed: Dec. 27, 2002

(65) Prior Publication Data

US 2003/0102951 A1 Jun. 5, 2003

Related U.S. Application Data

(62) Division of application No. 09/734,202, filed on Dec. 12, 2000, now Pat. No. 6,533,956.

(30) Foreign Application Priority Data

Dec. 16, 1999 (JP) ............................. 11-358139
Dec. 16, 1999 (JP) ............................. 11-358140
Dec. 16, 1999 (JP) ............................. 11-358141

(51) Int. Cl.$^7$ ............................. B28B 3/00; C04B 35/26
(52) U.S. Cl. ................. 264/611; 252/62.51 R; 252/62.56; 252/62.59
(58) Field of Search ............... 264/611; 252/62.51 R, 252/62.56, 62.59

(56) References Cited

U.S. PATENT DOCUMENTS 5,707,541 A * 1/1998 Kanemaru et al. ....... 252/62.56

FOREIGN PATENT DOCUMENTS

| JP | 4-65807 | 3/1992 |
| JP | 2747403 | 2/1998 |
| JP | 10-223414 | 8/1998 |
| JP | 10-223424 | 8/1998 |
| JP | 10-324564 | 12/1998 |

* cited by examiner

Primary Examiner—Christopher A. Fiorilla
(74) Attorney, Agent, or Firm—Oblon, Spivak, McClelland, Maier & Neustadt, P.C.

(57) ABSTRACT

A method including mixing powders of at least one of MgO, Mg(OH)$_2$, and MgCO$_3$, and powders of Fe$_2$O$_3$, CuO and ZnO, pre-sintering the mixed powder at 900° or lower, milling the pre-sintered raw powder, pressing the milled powder to form a pressed body and sintering the pressed body to form a magnetic ferrite powder such as MgCuZn, MgNiCuZn, or NiCuZn.

16 Claims, 7 Drawing Sheets

POWDER FOR MAGNETIC FERRITE, MAGNETIC FERRITE, MULTILAYER FERRITE COMPONENTS AND PRODUCTION METHOD THEREOF

This application is a Divisional application of application Ser. No. 09/734,202, filed Dec. 12, 2000 now U.S. Pat. No. 6,533,956.

BACKGROUND OF THE INVENTION

The present invention relates to multilayer chip components such as multilayer chip beads or multilayer chip inductors, magnetic ferrite and multilayer ferrite components to be used to composite multilayer components represented by LC composite multilayer components, as well as a method for producing the same.

Multilayer chip ferrite components and composite multilayer components (called generically as "multilayer ferrite component or components" in the present description) have been employed to various kinds of electric, electrical or electronic devices because of small volume and high reliability. The multilayer ferrite component is in general produced by laminating sheets or pastes for magnetic layers comprising magnetic ferrite and pastes for internal electrodes into a unitary one-body through a thick film laminating technique, sintering it, printing or transcribing pastes for external electrodes on the surface of the sintered body, and carrying out a sintering thereon. By the way, the sintering after laminating in one body is called as a co-firing. As a material for the internal electrode, Ag or Ag alloys are used because of low resistivity, and therefore as a magnetic ferrite material for composing magnetic layers, it is an absolute condition to enable the co-firing, in other words, enable the sintering at temperature below melting points of Ag or Ag alloys. Accordingly, for providing multilayer ferrite components of high density and high magnetic characteristics, it will be a key whether or not the magnetic ferrite can be sintered at the temperature below the melting points of Ag or Ag alloys.

NiCuZn ferrite is known as the magnetic ferrite which can be sintered at the temperature below the melting point of Ag or Ag alloys. In short, NiCuZn ferrite including powder of specific surface area rendered to be about 6 m²/g or more by a milling can be sintered at the temperature below the melting point of Ag (960° C.), and it has broadly been used to multilayer ferrite components. However, since NiCuZn ferrite has the magnetic characteristic, particularly permeability $\mu$ which are sensitive to external stress or thermal shock (refer to, for example, "Powder and Powder Metallurgy" vol. 39 & 8, pp. 612 to 617 (1992)), problems arise as mentioned under during producing multilayer ferrite components. That is, the permeability $\mu$ is deteriorated by stress caused by barrel polishing and plating in a producing procedure, stress caused by difference in coefficients of linear expansion between the magnetic layers and the internal electrodes, and stress caused when mounting members on a base board, and inductance L is deviated from a designed value.

For solving the problems, two resolutions have been proposed. One of them is to face the magnetic layer and the internal electrodes to be opposite via a space therebetween (JP-A-4-65807). This proposal is to avoid the stress caused by the difference in the coefficients of the linear expansion between the magnetic layers and the internal electrodes. The other one is to cause Bi to exist in crystal grain boundaries of NiCuZn ferrite, thereby to generate tensile stress in crystal grains after sintering so as to make the sensitivity of the magnetic characteristic insensitive to the external stress (JP-A-10-223424). These two proposals were the effective measures for deterioration of the magnetic characteristic of NiCuZn ferrite against the stress.

However, NiCuZn ferrite will be naturally an expensive material, because NiO as a raw material therefor is at high cost. Having paid attentions to MgCuZn ferrite using MgO, $Mg(OH)_2$ or $MgCO_3$ which are cheaper than NiO, there have been made various improvements. For example, JP-A-10-324564 proposes an amount of B (boron) to be 2 to 70 ppm in MgCuZn ferrite.

However, MgCuZn ferrite of this publication is sintered at 1200° C. according to examples, and it is difficult to apply this MgCuZn ferrite to the multilayer ferrite components directed by the invention. Because the co-firing cannot be carried out together with Ag or Ag alloys.

Japanese Patent No. 2,747,403 discloses the magnetic ferrite containing MgO, but does not refer to any sintering condition, and it is assumed not to satisfy the co-firing with Ag.

SUMMARY OF THE INVENTION

It is an object of the invention to offer magnetic ferrite of less deterioration of magnetic characteristic to stress, particularly of permeability $\mu$, enabling the low temperature sintering, that is, to sinter at temperature below melting points of Ag or Ag alloys to be used as materials for electrodes, and multilayer ferrite components employing such magnetic ferrite. It is another object of the invention to offer a method of producing magnetic ferrite and multilayer ferrite components.

Powder for magnetic ferrite of the invention has the to 35 mol % and MgO: 5 to 35 mol %, in which a peak position of particle size distribution ranges 0.3 to 1.2 $\mu$m. In powder for magnetic ferrite, one part of MgO may be replaced with NiO. Actually, a total amount of MgO and NiO is enough with 5 to 35 mol %.

Powder for magnetic ferrite of the invention has the composition of $Fe_2O_3$: 40 to 51 mol %, CuO: 7 to 30 mol %, ZnO: 0.5 to 35 mol % and MgO: 5 to 35 mol %, and is sintered at temperature below 940° C. Depending on this magnetic ferrite, the sintering is available at temperature below 940° C., and it is possible to obtain multilayer ferrite components of satisfied properties.

When the magnetic ferrite of the invention is sintered at temperature range of 940° C. or lower, a shrinkage is 10% or higher. This fact shows that the sintering below 940° C. is possible.

In the magnetic ferrite of the invention, the composition is desirable to be $Fe_2O_3$: 45 to 49.8 mol %, CuO: 8 to 25 mol %, ZnO: 15 to 25 mol % and MgO: 7 to 26 mol %.

The multilayer ferrite component of the invention uses the magnetic ferrite mentioned above and has external electrodes electrically connected to the internal electrodes which are alternately multilayer with the magnetic ferrite layer, said magnetic ferrite layer being composed of the sintered magnetic ferrite of $Fe_2O_3$: 40 to 51 mol %, CuO: 7 to 30 mol %, ZnO: 0.5 to 35 mol % and MgO: 5 to 35 mol % and also the internal electrodes being composed of Ag or Ag alloys.

The multilayer ferrite component of the invention has the alternate lamination of the dielectric layers and the internal electrodes, and may be integrally composed with the multilayer capacitor components having external electrodes electrically connected to the internal electrodes. In short, the composite multilayer components such as LC composite multilayer components are also defined as the multilayer ferrite components in the invention.

The multilayer ferrite component of the invention has the alternate lamination of the magnetic ferrite layers and the internal electrode layers and has external electrodes electrically connected to the internal electrodes, said magnetic ferrite layer being composed of the sintered ferrite of magnetostriction being $10 \times 10^{-6}$ or lower, and said internal electrode being composed of Ag or Ag alloys. In this multilayer ferrite components, it is preferable that the sintered ferrite is MgCuZn based ferrite having the composition of $Fe_2O_3$: 40 to 51 mol %, CuO: 5 to 30 mol %, ZnO: 0.5 to 35 mol % and MgO: 5 to 50 mol %.

The multilayer ferrite component of the invention is integrally united of inductor components having the alternate laminations of the magnetic ferrite layers and the internal electrode layers and capacitor components having the alternate laminations of the dielectric layers and the internal electrodes, and has the external electrode electrically connected to the internal electrode of the multilayer inductors and the multilayer capacitors. The magnetic ferrite layer of the multilayer inductor components is composed of the sintered MgCuZn based ferrite of the magnetostriction being $10 \times 10^{-6}$ or lower, and the internal electrode is composed of Ag or Ag alloys. In this multilayer ferrite components, it is preferable that the sintered MgCuZn based ferrite is MgCuZn based ferrite having the composition of $Fe_2O_3$: 45 to 49.8 mol %, CuO: 7 to 30 mol %, ZnO: 15 to 25 mol % and MgO: 5 to 35 mol %. Further, one part of MgO may be replaced with NiO. Actually, the composition has Fe2O3: 45 to 49.8 mol %, CuO: 7 to 30 mol %, ZnO: 15 to 25 mol % and MgO+NiO: 5 to 35 mol %.

The method of producing the magnetic ferrite comprises, according to the invention, a step of mixing raw powders, a step of pre-sintering the mixed raw powders at temperature of below 900° C., a step of milling the pre-sintered material, a step of pressing into a desired with shape powders of a peak in the distribution being 0.3 to 1.2 $\mu$m, selected from the milled powders, and a step of sintering the pressed bodies.

In the above magnetic ferrite producing method, the magnetic ferrite maybe MgCuZn based ferrite where the raw powders are one or two or more of Mg, $Mg(OH)_2$ and $MgCO_3$, $Fe_2O_3$ powder, CuO powder and ZnO powder. In such a case, an addition amount of CuO powder is desirably 5 to 25 mol %.

The method of the invention of producing the multilayer ferrite components having the multilayer magnetic layers and internal electrodes, comprises mixing raw powders of the magnetic ferrite, pre-sintering the mixed raw powders at temperature of below 900° C., milling the pre-sintered material, selecting such powders of a peak in the distribution of the particle size being 0.3 to 1.2 $\mu$m from the milled powders, and subsequently comprises a step of making sheets or pastes for forming the magnetic layers with said powders of particle size distribution peak ranging 0.3 to 1.2 $\mu$m, a step of alternately laminating said sheets or pastes and a material for internal electrodes for forming a multilayer body, and a step of sintering said multilayer body at temperature of 940° C. or lower.

In the above multilayer ferrite producing method, the materials for the internal electrode may be Ag or Ag alloys. The sintering temperature is desirable at 870 to 930° C.

DETAILED DESCRIPTION OF THE PREFERRED EMBODIMENTS

Figure 1:
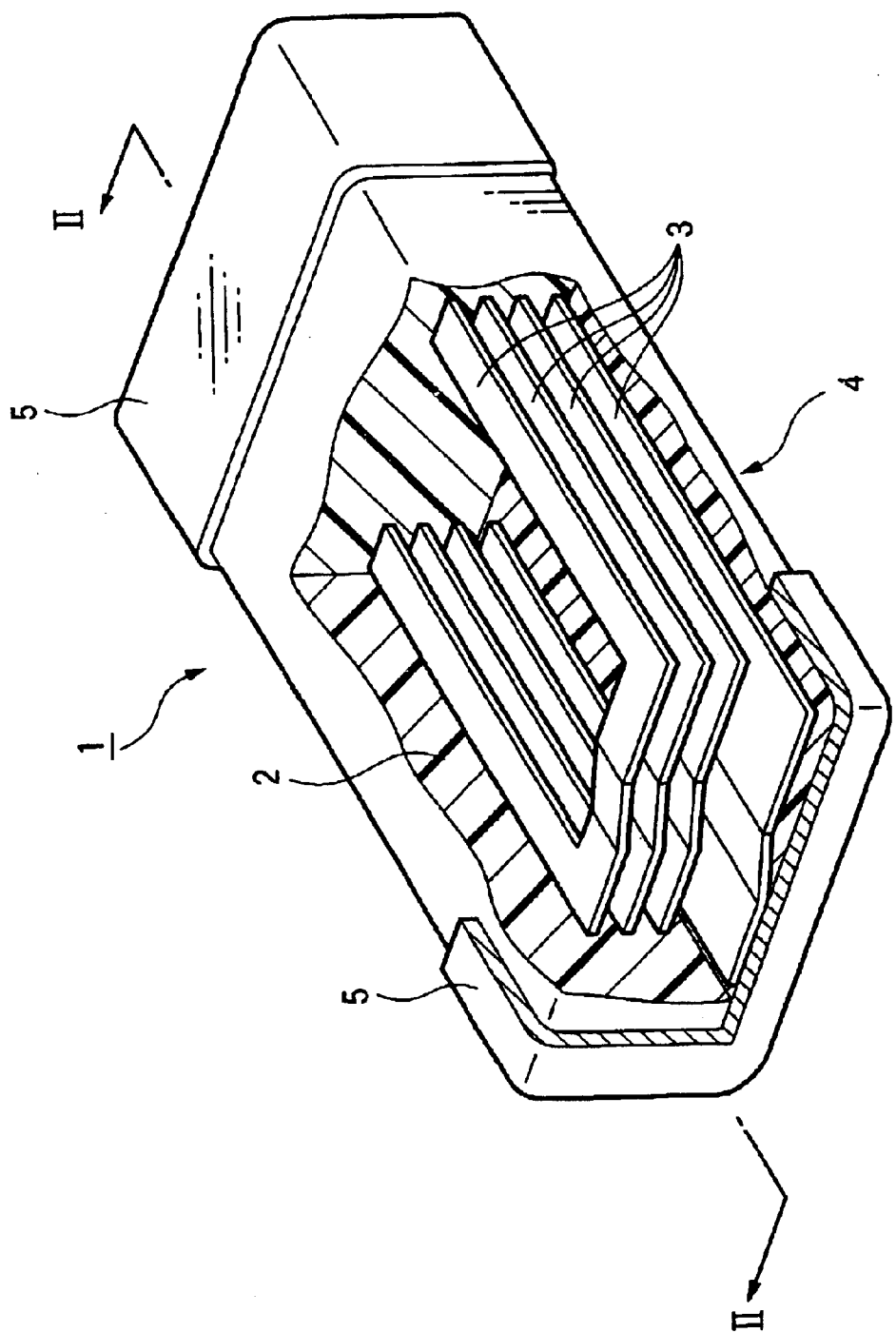
FIG. 1 is a schematically cross sectional view of the multilayer chip inductor.

Detailed explanation will be made to the invention.

First reference will be made to a cause in which the lower the magnetostriction, the smaller change of the permeability $\mu$ by stress.

MgCuZn ferrite and NiCuZn ferrite were used to observe deterioration of the permeability $\mu$ by stress. As a result, It was confirmed that MgCuZn ferrite was less than NiCuZn ferrite in the change of the permeability $\mu$. By the way, an initial permeability ($\mu i$) is known to be defined by the following formula. From this formula, it may be said that the less the magnetostriction of the material, the easier the deterioration of the permeability $\mu$ is restrained.

$$\mu i = AMs2/(aK1+b\lambda s\sigma)$$

(Ms=saturated flux density, K1=anisotropic constant $\lambda$s=magnetostriction, $\sigma$=stress).

When a comparison of the magnetostriction is made to MgCuZn ferrite and NiCuZn ferrite, MgCuZn is smaller. Although the magnetostriction is varied depending on compositions, the magnetostriction of NiCuZn ferrite exceeds $10 \times 10^{-6}$, while that of MgCuZn ferrite shows values below $10 \times 10^{-6}$. From this, it is imagined that if MgCuZn ferrite is used, it causes to lower the change of the permeability $\mu$ by stress.

Proposals have conventionally been made, as disclosed in JP-A-4-65807, that the magnetic layer and the internal electrode are faced via a space for reducing stress from the internal electrode, otherwise as JP-A-10-223414, Bi is caused to intervene at crystal grain boundaries for reducing stress from the grain boundaries. In short, the conventional proposals were to lessen the item of stress ($\sigma$) of the above formula for avoiding deterioration of the permeability.

In contrast, whereas the invention is to use a material of small magnetostriction ($\lambda$s) for avoiding deterioration of the permeability, it may be said that the invention is based on a different technical thought from that of the prior art. Moreover, MgCuZn ferrite can be produced at lower cost than in NiCuZn ferrite, and this is one of large merits for parts of electronic devices or electronic instruments farther progressing cost-down.

Herein, an obstacle is that the low temperature sintering using the conventional MgCuZn ferrite is difficult. An inventor made thereupon investigations for carrying out the low temperature sintering of MgCuZn ferrite, and found that it was useful to control the pre-sintering temperature of raw powder to be low, specifically to be 850° C. or lower, and further found that it was important to regulate distribution of milled powder after pre-sintering, specifically to use powder of the distributing peak of its diameter being positioned at 0.3 to 1.2 μm. It was clarified that if preparing the conditions of the pre-sintering temperature and the particle size distribution as mentioned above, MgCuZn ferrite could be sintered at low temperature, that is, 940° C. or lower, as securing sufficient characteristics.

The invention employs MgCuZn ferrite as the magnetic ferrite. As an actual embodiment of MgCuZn based ferrite, there exists MgCuZn ferrite. For realizing MgCuZn ferrite, it is sufficient to make raw powders of one or two kinds or more of MgO, $Mg(OH)_2$ and $MgCO_3$, $Fe_2O_3$ powder, CuO powder and ZnO powder. The composition (addition amount) therefor may be selected in view of a desired magnetic characteristic and other purposes, and basically the following ranges are satisfied. $Fe_2O_3$: 40 to 51 mol %, CuO: 5 to 30 mol %, ZnO: 0.5 to 35 mol %, and one or two kinds or more of MgO, $Mg(OH)_2$ and $CO_3$: 5 to 50 mol %.

In the invention, one part of Mg of MgCuZn ferrite may be replaced with Ni. In other words, the invention may use MgNiCuZn ferrite as MgCuZn based ferrite. In this case, NiO is added as raw powder, and may be added together with one or two kinds or more of MgO, $Mg(OH)_2$ and $MgCO_3$, ranging 5 to 50 mol % in total.

The magnetic characteristic of the magnetic ferrite has a very strong dependency on the composition, and in ranges out of the above composition, the permeability $\mu$ or the quality coefficient Q are lowered, and such magnetic ferrite is not suited for the multilayer ferrite components.

An embodiment of the invention will be described hereinafter.

The amount of $Fe_2O_3$ gives large influences to the permeability. If $Fe_2O_3$ is less than 40 mol %, the permeability is small, and as coming near to a stoichiometric composition as ferrite, the permeability goes upward, but rapidly goes down after a peak of the stoichiometric composition. Accordingly, an upper limit is 51 mol %. A preferable amount of $Fe_2O_3$ is 45.0 to 49.8 mol %.

CuO is a compound contributing to lowering of the sintering temperature, and being less than 7 mol %, the low temperature sintering below 940° C. cannot be realized. But being more than 30 mol %, a resistivity of the sintered body of ferrite is decreased and the quality coefficient Q is deteriorated, and so CuO ranges 7 to 30 mol %, preferably 8 to 25 mol %.

ZnO can heighten the permeability $\mu$ as increasing its amount, but being too much, a Curie temperature is lower than 100° C., so that the temperature characteristic demanded to electronic components cannot be satisfied. Therefore, the amount of ZnO ranges 0.5 to 35 mol %, preferably 15 to 25 mol %.

MgO is effective to decrease magnetostriction. For providing this effect, the amount of 5 mol % or higher is necessary. But since the permeability $\mu$ trends to go down as increasing the amount of MgO, an upper limit is 35 mol % or lower. A preferable amount ranges 7 to 26 mol %. In the magnetic ferrite and the powder for the magnetic ferrite of the invention, one part of MgO can be replaced with NiO, and the addition in such a case is 5 to 35 mol % in total with MgO, desirably 7 to 26 mol %. When replacing one part of MgO with NiO, the amount of NiO is preferably 70% or lower of said total amount. Because, exceeding 70%, the magnetostriction of the magnetic ferrite to be obtained is large, so that it is not easy to get the effect of avoiding deterioration of the permeability $\mu$. Further, $Mg(OH)_2$ and $MgCO_3$ may be used together with MgO or in place of MgO.

The magnetic characteristic of the magnetic ferrite has a very strong dependency on the composition, and in ranges out of the above composition, the permeability $\mu$ or the quality coefficient Q are small, and such magnetic ferrite is not suited as the multilayer ferrite components.

Incidentally, for producing the multilayer ferrite components of the invention, the co-firing is necessary. The co-firing should be carried out at temperature below 940° C., taking the melting points of Ag or Ag alloys to be internal electrodes into consideration. Therefore, it is important that the peak position in distribution of powder for the magnetic ferrite before sintering ranges 1.2 μm or lower. The inventor made studies on the low temperature sintering of MgCuZn ferrite, and found that if the peak of distribution of powder before sintering was positioned 1.2 μm or lower, the low temperature sintering was possible to MgCuZn ferrite which was conventionally difficult to be sintered at low temperature, and also found that it was useful for obtaining powder of such distribution to control the temperature of pre-sintering to be at 900° C., desirably 850° C. or lower. It was clear that if providing the above mentioned conditions of the pre-sintering temperature and the particle size distribution, MgCuZn ferrite could be sintered at low temperature as 940° C. or lower as securing the sufficient characteristics.

For obtaining powder for the magnetic ferrite of the invention, the pre-sintering temperature is to be 900° C. or lower, thereby enabling the low temperature sintering. Because, exceeding 900° C., the pre-sintered material is hardened, it is difficult to provide the distribution of powders enabling the low temperature sintering. The preferable temperature for pre-sintering is 730 to 850° C.

The pre-sintered material is milled, and the milled powder is sintered. It is important to the invention that the peak of the particle size distribution is positioned in the range of 0.3 to 1.2 μm. Exceeding 1.2 μm, the low temperature sintering, i.e., the sintering below 940° C. is difficult. Reversely, being 1.2 μm or smaller, the shrinkage percentage in the sintering at temperature of 940° C. or lower can be secured to be 10% or more, so that the magnetic ferrite having enough characteristics can be obtained. But, being less than 0.3 μm, a specific surface area is large, and it is difficult to obtain pastes or sheets for getting the multilayer ferrite components. The desirable peak position of the particle size distribution is 0.5 to 1.0 μm. For obtaining powder of such distribution, the milling condition should be controlled, but it is also possible to collect powder of such distribution from milled powder not depending on controlling of the conditions.

The magnetic ferrite powders of the invention are mixed powders of MgO powder, $Fe_2O_3$ powder, CuO powder and ZnO powder. When replacing one part of MgO with NiO, NiO powder is also mixed. When $Mg(OH)_2$ or $MgCO_3$ is used together with MgO or in place of MgO, it is sufficient to mix $Mg(OH)_2$ or $MgCO_3$. For more accelerating the low temperature sintering, various kinds of glasses such as boro-silicate glass or oxides of low melting points such as $V_2O_5$, $Bi_2O_3$, $B_2O_3$, $WO_3$ or PbO may be added.

Figure 2:
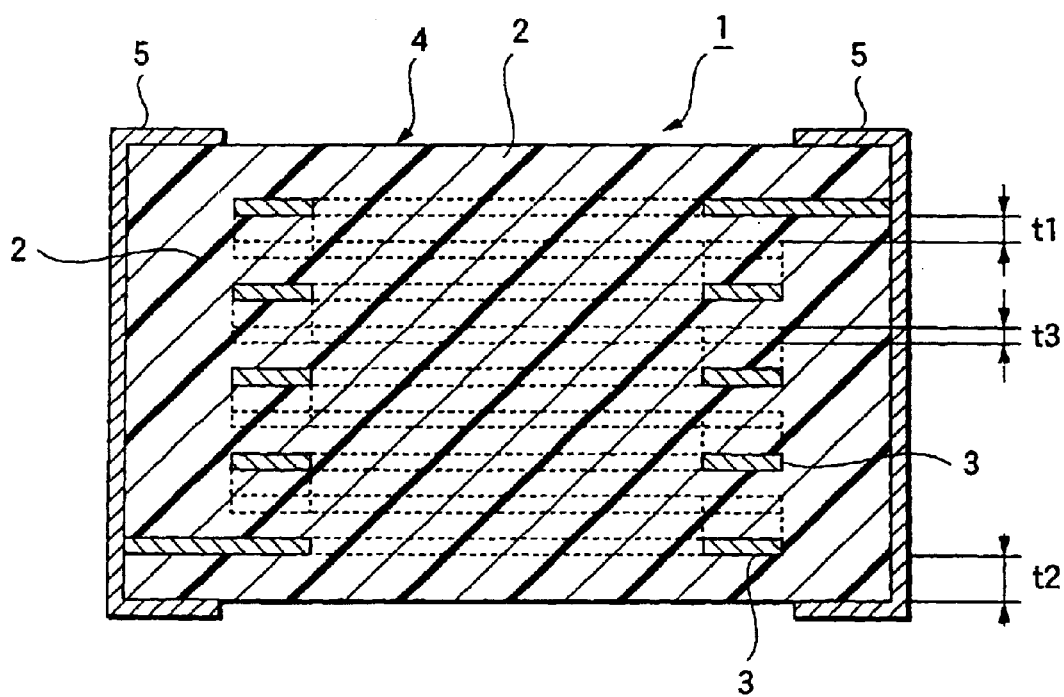
FIG. 2 is a cross sectional view along II—II.

Next reference will be made to the multilayer chip inductor which is one embodiment of the multilayer ferrite components. FIG. 1 is a schematically cross sectional view of the multilayer chip inductor, and FIG. 2 is a cross sectional view along II—II of FIG. 1. The multilayer chip inductor 1 is, as seen in FIG. 1, composed of a chip body 4 of multi-structure having alternate laminations of the magnetic ferrite layers 2 and the internal electrodes 3, and the external electrodes 5 disposed at both edges of the chip body 4 for electrically conducting the internal electrode 3.

The magnetic ferrite material of the invention is used to the magnetic ferrite layers 2. That is, the powder of the distribution peak ranging 0.3 to 1.2 μm is mixed with a binder and a solvent to provide pastes for forming the magnetic ferrite layers 2. This paste and a paste for forming the internal electrode 3 are alternately printed, multilayer and sintered so as to produce the chip body 4 of one-body.

For the binder, known binders as ethyl cellulose, acrylic resin or butyral resin may be used. For the solvent, known terpineol, butyl carbitol, or kerosene are available. The addition amounts of the binder and the solvent are not limited. But, ranges of 1 to 5 weight percents as the binder and 10 to 50 weight percents as the solvent are recommended.

Other than the binder and the solvent, dispersant, plasticizer, dielectric, and insulator may be added 10 weight percents or lower. As the dispersant, sorbitane fatty acid ester or glyceline fatty acid ester may be added. As the plasticizer, dioctylbphthalate, di-n-butyl phthalate, butyl phthalyl glycolic acid butyl may be added.

The magnetic ferrite layer 2 can be formed with a sheet therefor. Namely, the powder of the distribution peak ranging 0.3 to 1.2 μm is mixed with the binder of a main component being polyvinyl butyral and the solvent as toluene or xlylene for getting a slurry. The slurry is coated on a film as polyester film by, e.g., a doctor blade method, and dried to obtain the sheet for the magnetic ferrite layer 2. The sheets are alternately multilayer with the pastes for the internal electrode 3 and sintered, and the chip body 4 of multi-layered structure can be provided. The amount of the binder is not limited, but the range of 1 to 5 weight percents is recommended. Further, the dispersant, plasticizer, dielectric, and insulator may be added at 10 weight percents or lower.

Figure 3:
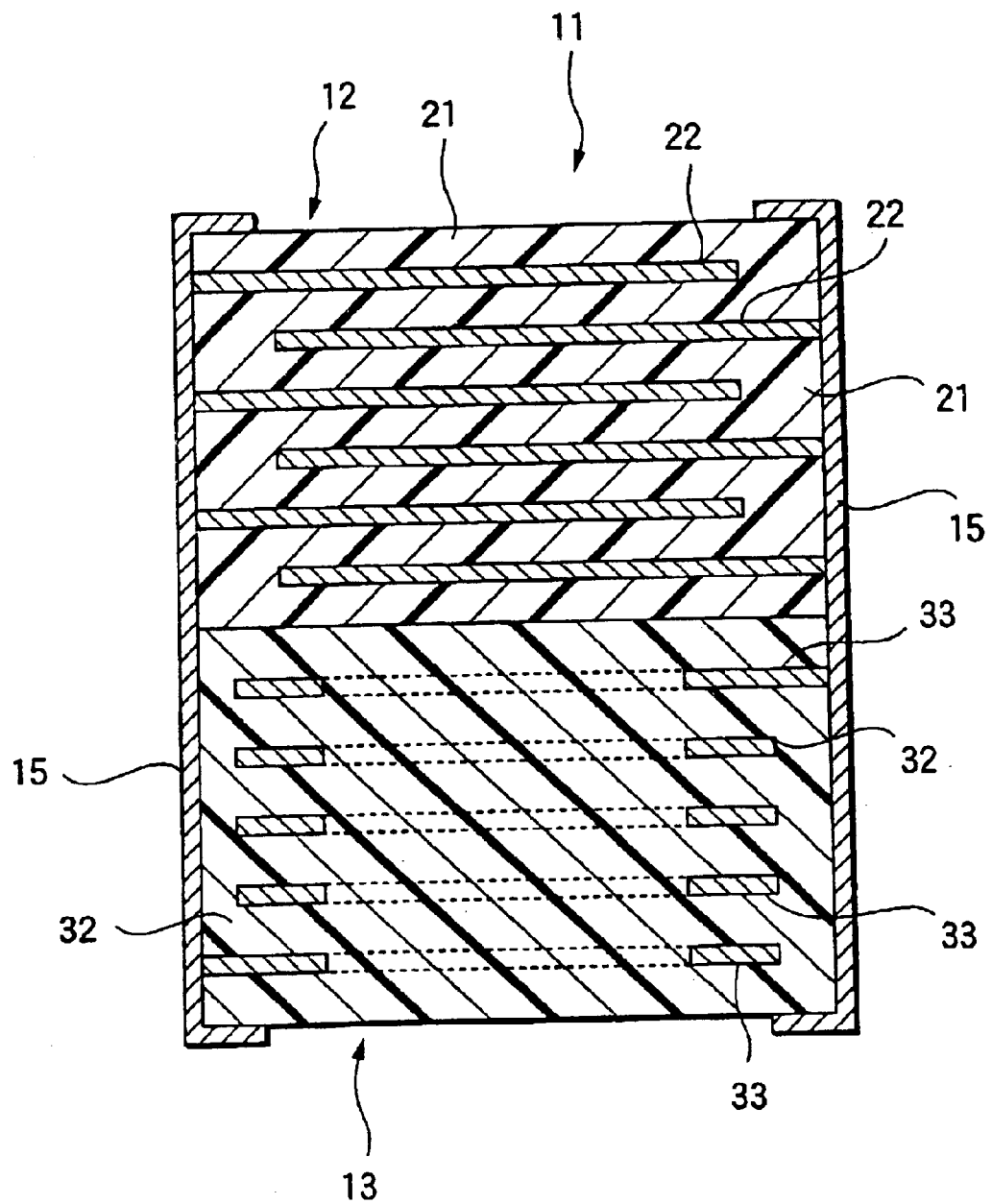
FIG. 3 is a cross sectional view of LC composite component according to the embodiment.

With respect to the internal electrodes 3, it is preferable to employ Ag or Ag alloys having small resistivity, e.g., Ag—Pd alloy for providing the quality coefficient Q practicable as the inductor, but not limiting thereto but enabling to use Cu, Pd or their alloys. The paste for obtaining the internal electrodes 3 is obtained by mixing and kneading powders of Ag or Ag alloys or their oxide powders with the binder and the solvent. For the binder and the solvent, the same as that used for forming the magnetic ferrite layer 2 may be applied. The internal electrode layers 3 are each elliptical and each of the adjacent layers is, as shown in FIG. 3, spiral for securing the electric conductivity and composing a closed magnetic circuit coil (coil pattern).

Materials for the external electrode 5 are known materials such as Ag, Ni, Cu, or Ag—Pd alloy. The external electrode 5 is formed with these materials by a printing method, plating method, vapor deposition method, ion plating method or spattering method.

No especial limitation is made to outer diameters and dimensions of the chip 4 of the multilayer chip inductor 1. Appropriate selection is decided depending on usage. In general, outward configurations are substantially rectangular parallelepiped, and many dimensions are 1.0 to 4.5 mm×0.5 to 3.2 mm×0.6 to 1.9 mm. Space t1 between electrodes and thickness t2 of a base of the magnetic ferrite layer 2 are not especially limited. The space t1 may be determined to be 10 to 100 μm and the thickness t2 may be 250 to 500 μm, and further, the thickness t3 of the internal electrode 3 itself ranges ordinarily 5 to 30 μm, pitches of coiling pattern are 10 to 100 μm, and the coiling number is around 1.5 to 20.5 turns.

The sintering temperature after alternately laminating the pastes or sheets for the magnetic ferrite layers 2 and the pastes for the internal electrodes 3 is determined to be 940° C. or lower. Because being higher than 940° C., materials composing the internal electrode 3 in the magnetic ferrite layer 2 are diffused and the magnetic characteristic is remarkably reduced. Although the magnetic ferrite is suited to the low temperature sintering, a sintering at temperature of less than 800° C. is not sufficient. Therefore, the sintering is desirable at temperature of 800° C. or higher. A desirable sintering temperature ranges 820 to 930° C., more desirable is 875 to 920° C. The sintering time is 0.05 to 5 hours, desirably 0.1 to 3 hours Further explanation will be made to LC composite components being one embodiment of the multilayer LC composite components. FIG. 3 is a schematically cross sectional view of LC composite component.

As shown in FIG. 3, the LC composite component 11 is composed by uniting a chip capacitor 12 and a chip ferrite component 13.

The chip capacitor 12 has a multi-layered structure of alternately laminating ceramic dielectric layers 21 and internal electrodes 22. No limitation is made to the ceramic dielectric layer 21, and known existing dielectric materials may be employed therefor. In the invention, titanium oxide of the low sintering temperature is desirable, and titanic acid based composite oxides, zirconic acid based composite oxides, or their mixture may be used. For decreasing temperature, various kinds of glasses such as boro-silicate glass may be added. As the internal electrode 22, the same material as the internal electrode 3 of the multilayer chip inductor 1 can be used as mentioned above. The internal electrode 22 is electrically connected alternately to other external electrodes.

The chip ferrite component 13 is composed of the multilayer chip inductor 1 having the alternate lamination of the magnetic ferrite layer 32 and the electrode layers 33. This structure is the same as the multilayer chip inductor 1 mentioned above. Therefore, a detailed explanation will be omitted herein.

No limitation is made to outer diameters and dimensions of the LC composite component 11 as explained in the multilayer chip inductor 1. Accordingly, appropriate selection is decided depending on usage. In general, outward configurations are almost rectangular parallelepiped, and dimensions are 1.6 to 10.0 mm×0.8 to 15.0 mm×1.0 to 5.0 mm.

EXAMPLES

The invention will be explained by way of Examples.

Example 1

Figure 4:
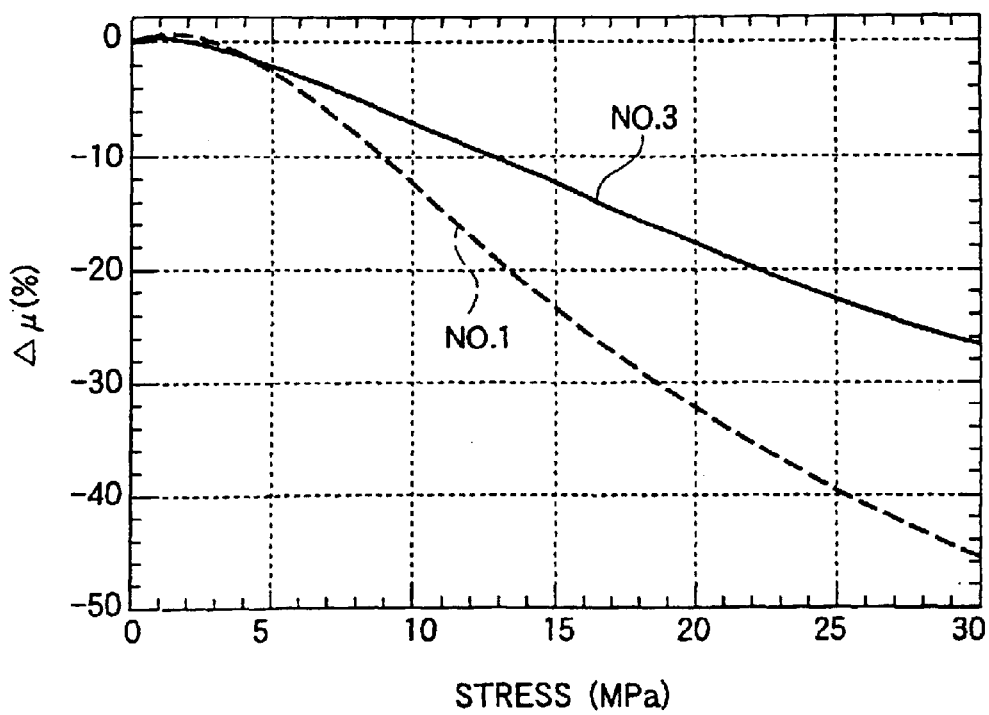
FIG. 4 is a graph showing the stress dependence of the permeability $\mu$ of MgCuZn ferrite and NiCuZn ferrite.

The magnetic ferrite materials were produced with the mixed composition shown in Table 1 and under the following producing conditions. Measurements were made on the permeability $\mu$, the stress resistivity characteristic, the magnetostriction and the density of the produced magnetic ferrite. The results of the permeability $\mu$, the magnetostriction and the density are shown in Table 2 and the stress resistivity characteristic is shown in FIG. 4.

Producing Conditions

The raw powder was weighed in accordance with table 1 and mixed to wet mixture in the ball mill consist of stainless steel pot and steel ball media for 16 hours (the dispersant was a pure water). After the mixture was completed, the mixed powder was dried by the spray dryer, followed by the pre-sintering at 760° C. for 10 hours. After the pre-sintering, the sintered powder was milled for 66 hours in the ball mill, and the milled powder was sintered to produce the sintered body of toroidal and rectangular paralelopiped shapes. The sintering temperature was 900° C. and the holding time was 2 hours.

The measuring method of each of characteristics is as follows.

Magnetostriction

The test samples of 5×5×20 mm were measured with the saturated magnetostriction measuring apparatus made by Naruse Scientific Machinery Co., Ltd.

Particle Size Distribution

The powder of 0.02 g to be measured in distribution was dispersed in the water of 100 ml. The measuring path of the particle size distributing gauge was washed away, and the reference of the particle size diameter distributing gauge was measured for measuring the particle size distribution. The dispersion and distribution of the powder were measured with the Helos System of Sympatec Inc.

The particle size distribution and frequency were calculated with the program of the particle size distribution gauge through the laser diffraction method.

Permeability

The sample of toroidal shape was wound 20 turns with the copper made wire (diameter: 0.35 mm), and inductance was measured at the measuring frequency of 100 kHz and the current of 0.2 mA with LCR meter (made by Hewlett Packard Inc.), and the permeability was demanded by the following formula.

$$\text{Permeability } \mu = (le \times L)/(\mu 0 \times Ae \times N^2)$$

herein,
 le: Length of the magnetic path,
 L: Inductance of the sample,
 $\mu 0$: Permeability of vacuum=$4\pi \times 10^{-7}$ (H/m),
 Ae: Cross sectional area of the sample, and
 N: winding number of the coil.

Stress Resistance Characteristic

The sample of square toroidal shape was wound 20 turns with the copper made wire (diameter: 0.35 mm), and connected to LCR meter (made by Hewlett Packard Inc.). Under this condition, the decreasing rate of the inductance was measured under the conditions of the measuring frequency of 100 kHz and the current of 0.2 mA, while loading by the bending resistance strength tester. For comparing with the decreasing rate of the permeability $\mu$, the decreasing rate of the inductance is shown as the permeability $\mu$ in FIGS. 4 and 5.

TABLE 1

| | | mol % | | | | |
|---|---|---|---|---|---|---|
| No. | $Fe_2O_3$ | NiO | MgO | CuO | ZnO | Sorts of Ferrites |
| 1 | 49 | 14.0 | — | 9.5 | 27.5 | NiCuZn |
| 2 | 49 | 21.0 | — | 9.0 | 21.0 | NiCuZn |
| 3 | 49 | — | 14.0 | 9.5 | 27.5 | MgCuZn |
| 4 | 49 | — | 21.0 | 9.0 | 21.0 | MgCuZn |
| 5 | 49 | 7.0 | 7.0 | 9.6 | 21.0 | MgNiCuZn |

TABLE 2

| | Sintered materials | | | Multilayer ferrite chip inductor | |
|---|---|---|---|---|---|
| No. | A (× $10^{-6}$) | B ($\mu$) | Density (g/cm³) | Inductance ($\mu$H) | C (Q) |
| 1 | 12.0 | 279 | 4.91 | 5.6 | 39.0 |
| 2 | 18.0 | 107 | 4.81 | 2.5 | 38.5 |
| 3 | 3.0 | 240 | 4.64 | 7.2 | 41.0 |
| 4 | 3.2 | 104 | 4.75 | 3.2 | 40.7 |
| 5 | 7.0 | 260 | 4.78 | 6.2 | 41.0 |

A: Magnetostriction
B: Permeability
C: Quality coefficient

From Tables 1 and 2, the following was found.

Nos. 3 and 1 are different in that No. 3 is added with MgO of 14 mol % and No. 1 is added with NiO of 14 mol %, but the other elements are the same. Comparing both magnetostrictions ($\lambda s$), No. 3 is $3 \times 10^{-6}$, while No. 1 is $12 \times 10^{-6}$. That is, it is seen that MgCuZn ferrite is smaller than NiCuZn ferrite in the magnetostriction. This face can be comprehended from the magnetostrictions of Nos. 4 and 2 which are the same elements except MgO and NiO.

Further, comparing Nos. 1 and 2, the magnetostrictions are largely changed from $12 \times 10^{-6}$ to $18 \times 10^{-6}$ by increasing the content of NiO from 14 mol % to 21 mol %. In contrast, comparing Nos. 3 and 4, though MgO increases from 14 mol % to 21 mol %, the magnetostriction only changes from $3 \times 10^{-6}$ to $3.2 \times 10^{-6}$. In short, it may be understood even if the content of MgO increases, basically it does not make the magnetostriction large.

No. 5 is an example where NiO was added together with MgO, and comparing Nos. 1 and 2, the magnetostriction is small and the permeability $\mu$ has a good value.

Figure 5:
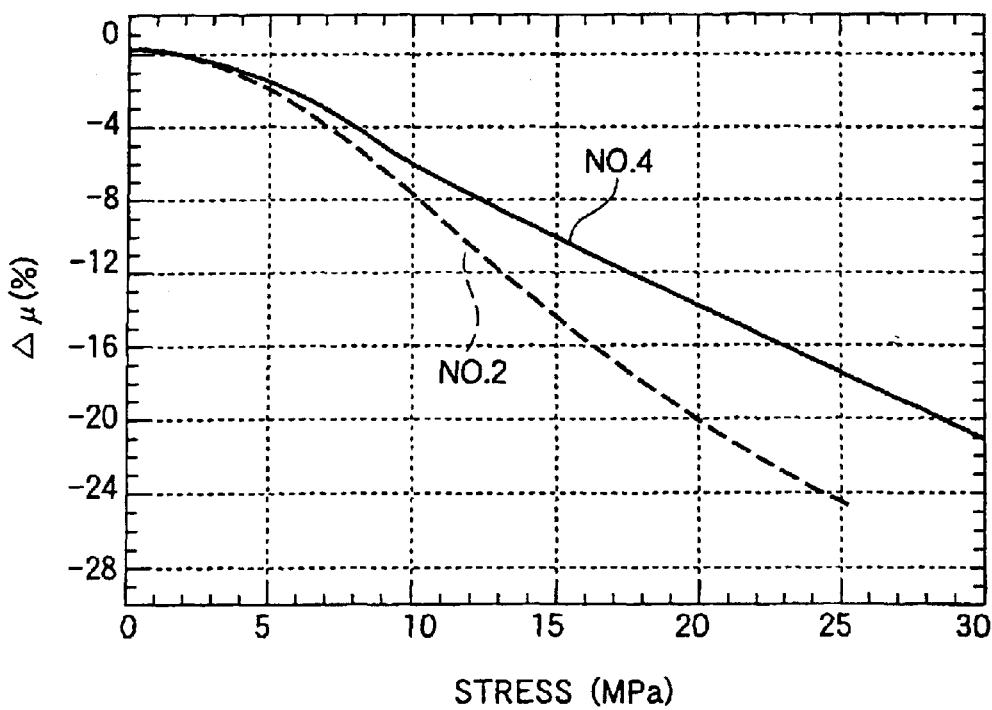
FIG. 5 is a graph showing the stress dependence of the permeability $\mu$ of MgCuZn ferrite and NiCuZn ferrite.

FIG. 4 shows the stress resistance characteristics of Nos. 3 and 1, and FIG. 5 shows those of Nos. 4 and 2. From FIGS. 4 and 5, it can be understood that the permeability $\mu$ is deteriorated by giving stress. However, it is seen from FIG. 4 that the deterioration degree of the permeability $\mu$ is smaller in No. 3 ($3 \times 10^{-6}$) of the small magnetostriction than No. 1 ($12 \times 10^{-6}$) of the large magnetostriction. The same is applied to FIG. 5. Accordingly, for reducing the deterioration degree of the permeability $\mu$ by stress, it is advantageous to employ MgCuZn based ferrite of small magnetostriction.

To 100 weight percents of the powder having the composition in Table 1, added were 2.5 weight percents of ethyl cellulose and 40 weight percents of terpineol, and those were mixed by a three-roll-mill for preparing the pastes for the magnetic ferrite layers. On the other hand, to 100 parts of Ag of the average powder being 0.8 $\mu$m, added were 2.5 weight percents of ethyl cellulose and 40 weight percents of terpineol, and those were mixed by the three-roll-mill for preparing the pastes for the internal electrodes. The pastes for the magnetic ferrite layers and the pastes for the internal electrode layers were printed and alternately multilayer, and sintered at 900° C. for 2 hours for providing the multilayer chip inductors as shown in FIGS. 1 and 2. The dimension of the multilayer chip inductor 1 of 2012 type is 2.0 mm×1.2 mm×1.1 mm, and the coil windings are 4.5 turns. The multilayer chip inductor 1 was fired at its edges with the external electrodes 5 at 600° C.

With respect to the obtained multilayer chip inductor 1, the inductance L and the quality coefficient Q were measured at the measuring frequency of 100 kHz and the measuring current 0.2 mA and with the LCR meter (made by Hewlett Packard Inc.).

The results are shown in Table 2. If either of MgCuZn ferrite and MgNiCuZn ferrite was used, the equivalent characteristics could be obtained to those of the multilayer chip inductor using the conventional NiCuZn ferrite.

Example 2

The Example 2 was to confirm influences given by the content of CuO. The samples were made with the mixing elements shown in Table 3 and under the same conditions as those of the Example 1, and the permeability $\mu$ and the density were measured. The results are shown in Table 4.

TABLE 3

| No. | Fe$_2$O$_3$ | NiO | MgO | CuO | ZnO | Sorts of Ferrites |
|---|---|---|---|---|---|---|
| 6 | 49 | — | 23.5 | 4.0 | 23.5 | MgCuZn |
| 7 | 49 | — | 21.5 | 8.0 | 21.5 | MgCuZn |
| 8 | 49 | — | 19.5 | 12.0 | 19.5 | MgCuZn |
| 9 | 49 | — | 17.5 | 16.0 | 17.5 | MgCuZn |
| 10 | 49 | — | 15.5 | 20.0 | 15.5 | MgCuZn |
| 11 | 49 | — | 13.5 | 24.0 | 13.5 | MgCuZn |
| 12 | 49 | — | 11.5 | 28.0 | 11.5 | MgCuZn |

(mol %)

TABLE 4

| | Sintered materials | | Multilayer ferrite chip inductor | | Remarks |
|---|---|---|---|---|---|
| No. | B ($\mu$) | Density (g/cm$^3$) | Inductance ($\mu$H) | C (Q) | CuO (mol %) |
| 6 | 40 | 3.87 | 1.0 | 20.0 | 4.0 |
| 7 | 180 | 4.66 | 4.6 | 38.0 | 8.0 |
| 8 | 210 | 4.75 | 5.4 | 39.0 | 12.0 |
| 9 | 224 | 4.80 | 5.7 | 40.0 | 16.0 |
| 10 | 218 | 4.81 | 5.6 | 39.3 | 20.0 |
| 11 | 200 | 4.83 | 5.1 | 38.4 | 24.0 |
| 12 | 100 | 4.85 | 2.6 | 24.4 | 28.0 |

B: Permeability
C: Quality coefficient

From Tables 3 and 4, it is seen that the permeability $\mu$ is improved as increasing the amount of CuO, but exceeding more than 24 mol %, it largely goes down. When CuO is 4.0 mol %, a practically sufficient magnetic characteristic cannot be provided, and if being 28.0 mol %, the magnetic permeability is worsened. In view of the magnetic characteristic, the CuO amount is desirably 5 mol % to 25 mol %.

Figure 6:
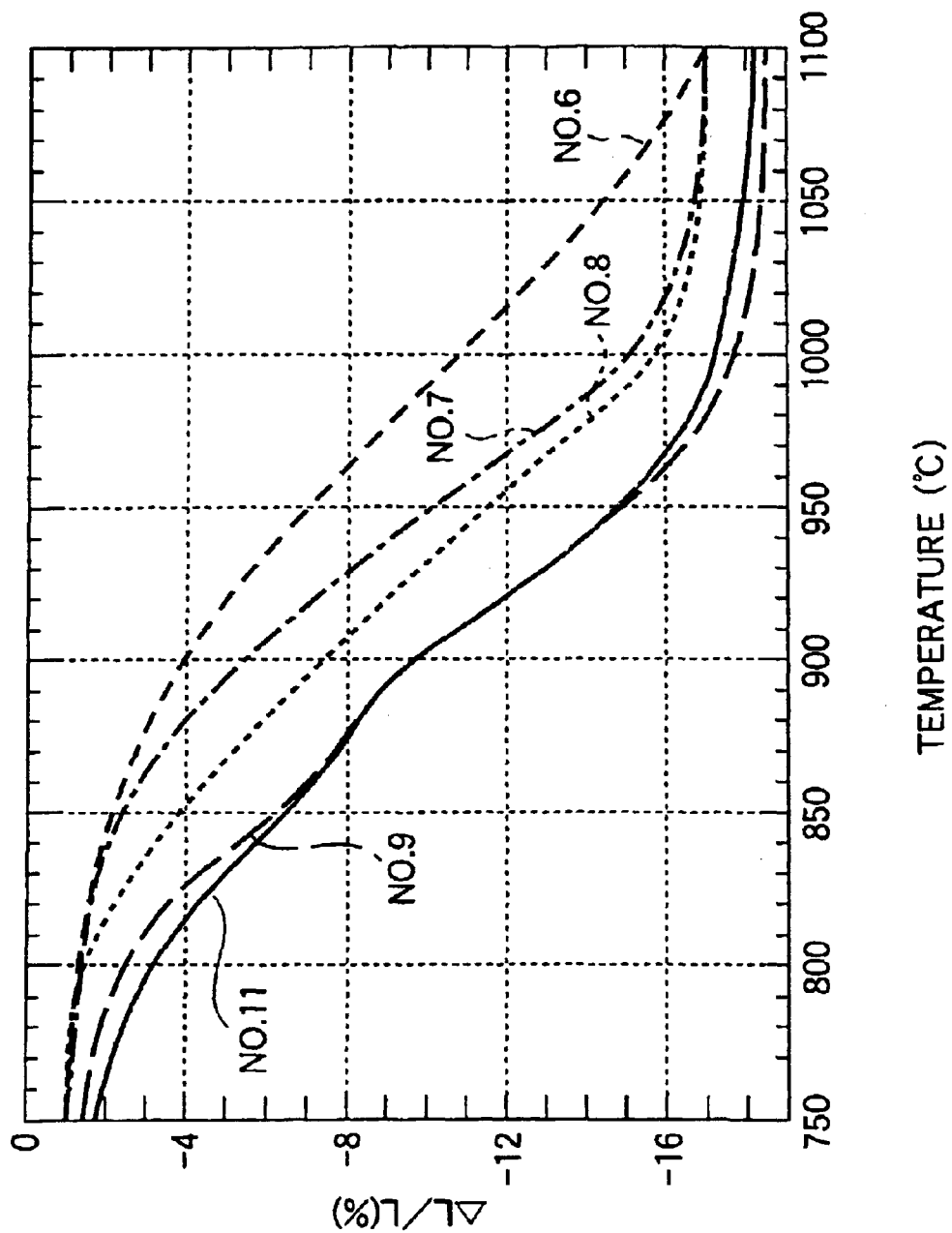
FIG. 6 is a graph showing the effect of CuO contents on the densification characteristics.

In Table 3, with respect to No. 6 (CuO: 4.0 mol %), No. 7 (CuO: 8.0 mol %), No. 8 (CuO: 12.0 mol %), No. 9 (CuO: 16.0 mol %) and No. 11 (CuO: 24.0 mol %), the milled pre-sintered powder was heated up to a predetermined temperature and the shrinkage percentage ($\Delta L/L$) was measured. The shrinkage percentage serves as a standard for easy sintering, and it will be able to regarded that the larger the shrinkage percentage, the easier the sintering. The results are shown in FIG. 6. The lines of FIG. 6 are called as the heat shrinking curves. From FIG. 6, it is seen that the shrinkage percentage becomes larger as the CuO amount increases. That is, by the CuO-addition, the sintering was made easy and the sintering at lower temperature was available.

When comparing No. 9 (CuO: 16.0 mol %) and No. 11 (CuO: 24.0 mol %), it is comprehended that CuO is enough with around 20.0 mol %. On the other hand, No. 6 (CuO: 4.0 mol %) is smaller than No. 7 (CuO: 8.0 mol %) in the shrinkage percentage, and for fully enabling the low temperature sintering, CuO should be 7 mol %, more preferably 10.0 mol % or high.

The multilayer chip inductor was made similarly to the Example 1, and the inductance L and the quality coefficient Q were measured as well similarly thereto. The results are shown in Table 4. Also in the multilayer chip inductor, it was confirmed that the good inductance L and the good quality coefficient Q were obtained in the example where CuO was 8.0 to 24.0 mol %.

Example 3

The Example 3 was to confirm influences given by the pre-sintering temparature. The samples were made with the mixing elements shown in Table 5 and under the same conditions as those of the Example 1 (the sintering temperature 900° C.), except that the pre-sinterings were carried out at various temperatures and the permeability $\mu$ and the density were measured similarly to the Example 1. Table 6 shows the measured results of the permeability $\mu$ and the density per each of pre-sintering temperatures.

TABLE 5

| No. | Fe$_2$O$_3$ | NiO | MgO | CuO | ZnO | Sorts of ferrites |
|---|---|---|---|---|---|---|
| | 49 | — | 19.5 | 11.0 | 20.5 | MgCuZn |

(mol %)

TABLE 6

| | Pre-sintering- | Sintered materials | | Multilayer ferrite chip inductor | |
|---|---|---|---|---|---|
| No. | temperature (° C.) | B ($\mu$) | Density (g/cm$^3$) | Inductance ($\mu$H) | C (Q) |
| 13 | 700 | 100 | 4.41 | 2.6 | 38.5 |
| 14 | 730 | 108 | 4.43 | 2.8 | 38.4 |
| 15 | 760 | 115 | 4.58 | 2.9 | 39.0 |
| 16 | 790 | 119 | 4.61 | 3.0 | 40.0 |
| 17 | 810 | 136 | 4.65 | 3.5 | 40.2 |
| 18 | 850 | 128 | 4.63 | 3.3 | 39.2 |
| 19 | 900 | 94 | 4.14 | 2.4 | 20.0 |

B: Permeability
C: Quality coefficient

As the general tendency, until the range where the pre-sintering temperature is 850° C., when temperature becomes higher, the permeability $\mu$ and the density become higher. This means that effects of the pre-sintering is exhibited as increasing of the pre-sintering temperature. When the temperature is high as 900° C., the permeability $\mu$ and the density decrease.

Figure 7:
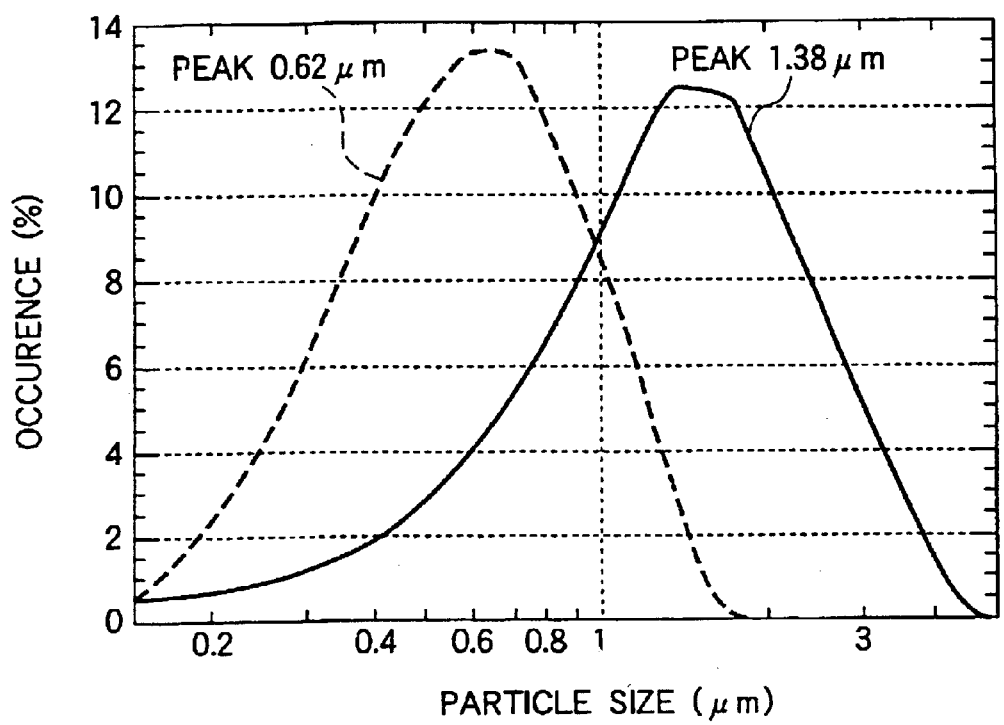
FIG. 7 is a graph showing the particle size distribution measured in the Example 3.

The raw powder having the mixed elements shown in Table 5 was pre-sintered at 850° C., and two kinds of powders shown in FIG. 7 was obtained by changing the milling condition.

Figure 8:
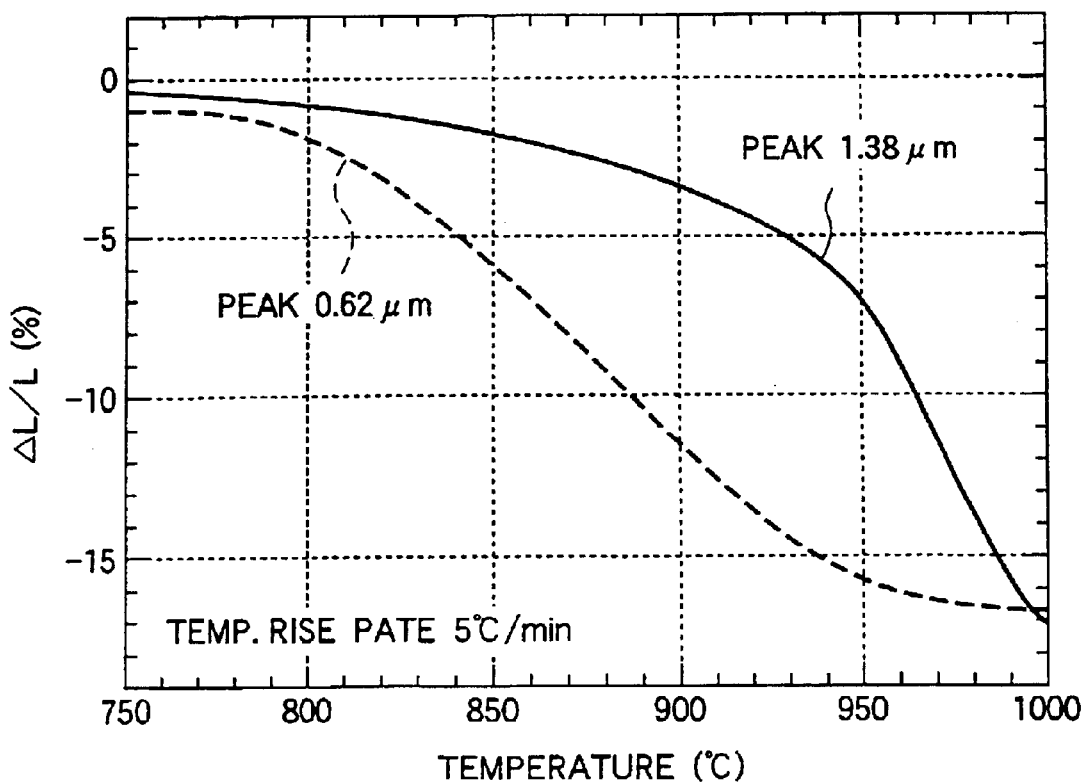
FIG. 8 is a graph showing the effect of the peak positions in particle size distribution on the densification characteristics.

By using the two kinds of powders, the heat-shrinking curves were sought for observing influences given to the sintering by the peak position of the particle size distribution. The results are shown in FIG. 8.

It is seen that the powder of the peak position of the distribution being 0.62 $\mu$m is larger in the shrinkage percentage than the powder of 1.38 $\mu$m in the range of 750 to 1000° C. It may be said that the larger the shrinkage percentage, the more easily the sintering progresses, and so it is seen that the powder of peak position being 0.62 $\mu$m is more excellent in the sinterability than the powder of 1.38 $\mu$m.

In the invention, for enabling to co-firing with Ag or Ag alloys forming the internal electrode, it is required as mentioned above to perform the sintering at the low temperature of 940° C. or lower. On the other hand, the powder of the distribution peak being 0.62 $\mu$m is larger than the powder of 1.38 $\mu$m in the shrinkage percentage at temperature of 940° C. or lower and may be said to be suited to the low temperature sintering.

Figure 9:
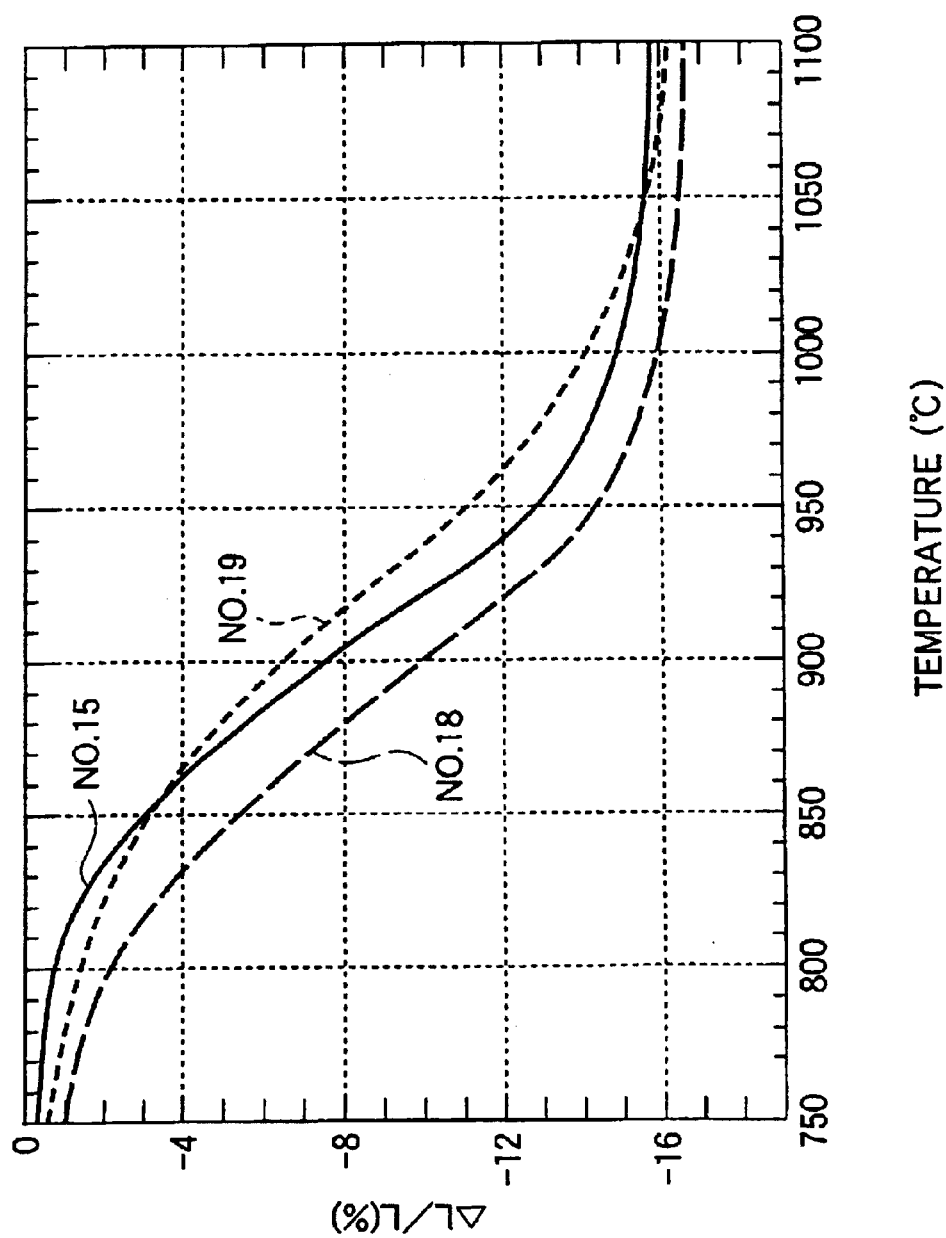
FIG. 9 is a graph showing the effect of the pre-sintered temperature on the densification characteristics.

In FIG. 6, with respect to No. 15 (pre-sintering temperature: 760° C.), No. 18 (pre-sintering temperature: 850° C.), and No. 19 (pre-sintering temperature: 900° C.), the shrinkage percentages were measured when the milled powders after pre-sintering were heated at predetermined temperatures. The results are shown in FIG. 9. Among the three pre-sintering temperatures, No. 18 of 850° C. shows the largest shrinkage percentage and is suited to the low temperature sintering. No. 19 of pre-sintered at 900° C. shows that the pre-sintered powder was too hard and the milling was not complete, so that it is assumed that the shrinkage percentage was smaller than No. 18. In No. 15 of 760° C., the single phase structure of spinel was not obtained by pre-sintering, so that it is assumed that the shrinkage percentage by heating was inferior to that of No. 18. According to other studies, it was confirmed that the single structure of spinel could be obtained by pre-sintering at temperature of 800° C. or higher. It is therefore important to take this point into consideration for determining the pre-sintering temperature.

The multilayer chip inductor was made similarly to the Example 1, and the inductance L and the quality coefficient Q were measured as well similarly thereto. The results are shown in Table 6. Also in the multilayer chip inductor, it was confirmed that the good inductance L and the good quality coefficient Q were obtained at temperature of 850° C. or lower, but at 900°, the inductance L and the quality coefficient Q abruptly dropped.

Example 4

The Example 4 was to confirm influences given by the sintering temperature. The samples were made with the mixing elements shown in Table 7 and under the same conditions as those of the Example 1 (the pre-sintering temperature 760° C.), except that the sintering were carried out at various temperatures and the permeability $\mu$ and the density were measured similarly to the Example 1. Table 8 shows the measured results of the permeability $\mu$ and the density per each of the pre-sintering temperatures. The multilayer chip inductance was made similarly to the Example 1 and the inductance L and the quality coefficient Q were measured similarly to the Example 1. The results are shown in Table 8.

TABLE 7

| | mol % | | | | | |
|---|---|---|---|---|---|---|
| No. | $Fe_2O_3$ | NiO | MgO | CuO | ZnO | Sorts of ferrites |
| | 49.5 | — | 13.3 | 11.0 | 26.2 | MgCuZn |

TABLE 8

| | Sintering | Sintered materials | | Multilayer ferrite chip inductor | |
|---|---|---|---|---|---|
| No. | temperature (° C.) | B ($\mu$) | Density (g/cm$^3$) | Inductance ($\mu$H) | C (Q) |
| 20 | 850 | 60 | 4.28 | 1.5 | 21.0 |
| 21 | 870 | 131 | 4.60 | 3.4 | 37.0 |
| 22 | 890 | 266 | 4.74 | 6.8 | 40.0 |
| 23 | 910 | 420 | 4.75 | 10.8 | 40.5 |
| 24 | 930 | 702 | 4.96 | 18.0 | 41.0 |
| 25 | 950 | 831 | 5.01 | 0.1 | 0.1 |

B: Permeability
C: Quality coefficient

In Table 8, the permeability $\mu$ of the density of the sintered materials are improved as the sintering temperature becomes higher. So, seeing these results only, a selection of high temperature is desirable. However, the inductance L and the quality coefficient Q abruptly drop at 950° C. sintering. This is because Ag composing the internal electrode is diffused in the magnetic ferrite layer. Accordingly, when producing multilayer ferrite components using Ag or Ag alloys as the materials of the internal electrode, the sintering should be carried out at temperature of less than 950° C.

As mentioned above, according to the invention, it is possible to produce the magnetic ferrite of less deterioration in the permeability $\mu$ to stress and enabling to be sintered at low temperature sintering, that is, below the melting points of Ag or Ag alloys using as the materials of electrode, and the multilayer ferrite components at low cost.

What is claimed is:

1. A method of producing magnetic ferrite, comprising:
   mixing raw powders;
   pre-sintering said mixed raw powders at temperature of 900° C. or lower;
   milling the pre-sintered mixed raw powders to form a milled powder having a particle size distribution with a peak position of from 0.3 to 1.2 $\mu$m;
   pressing the milled powder into a shape to form a pressed body; and
   sintering the pressed body to form a MgCuZn magnetic ferrite,
   wherein said raw powders comprise at least $Fe_2O_3$ powder, CuO powder, ZnO powder and at least one powder selected from the group consisting of MgO, $Mg(OH)_2$ and $MgCO_3$.

2. The method as claimed in claim 1, wherein CuO powder is present in an amount of from 5 to 25 mol %.

3. The method as claimed in claim 1, wherein the pre-sintered mixed raw powders are milled to a particle size distribution having a peak position of from 0.5 to 1.0 $\mu$m.

4. The method as claimed in claim 1, wherein the pre-sintering is carried out at a temperature of 850° C. or lower.

5. The method as claimed in claim 1, wherein the pre-sintering is carried out at a temperature of from 730 to 850° C.

6. The method as claimed in claim 1, wherein mixing the raw powders includes mixing $Fe_2O_3$, MgO, CuO, and ZnO.

7. The method as claimed in claim 1, wherein mixing the raw powders includes mixing $Mg(OH)_2$, $Fe_2O_3$, CuO, and ZnO.

8. The method as claimed in claim 1, wherein MgO, $Mg(OH)_2$, and $MgCO_3$ are present in the raw powder.

9. A method comprising:
   mixing raw powders to form a mixed powder,
   pre-sintering the mixed powder at a temperature of 900° C. or lower,
   milling the pre-sintered mixed powder to form a milled powder having a particle size distribution with a peak position of from 0.3 to 1.2 $\mu$m,
   pressing the milled powder into a shape to form a pressed body, and
   sintering the pressed body to form a MgCuZn, NiCuZn, or MgNiCuZn magnetic ferrite,
   wherein said raw powders comprise at least $Fe_2O_3$ powder, CuO powder, NiO powder, ZnO powder and at least one powder selected from the group consisting of MgO, $Mg(OH)_2$ and $MgCO_3$.

10. The method as claimed in claim 9, wherein CuO powder is present in an amount of from 5 to 25 mol %.

11. The method as claimed in claim 9, wherein the peak position of the milled powder is from 0.5 to 1.0 $\mu$m.

12. The method as claimed in claim 9, wherein the pre-sintering is carried out at a temperature of lower than 850° C.

13. The method as claimed in claim 9, wherein the pre-sintering is carried out at a temperature of from 730 to 850° C.

14. The method as claimed in claim 9, wherein mixing includes mixing MgO, $Fe_2O_3$, NiO, CuO, and ZnO.

15. The method as claimed in claim 9, wherein mixing includes mixing $Mg(OH)_2$, $Fe_2O_3$, NiO, MgO, CuO, and ZnO.

16. The method as claimed in claim 9, wherein MgO, $Mg(OH)_2$, and $MgCO_3$ are present in the raw powder.

* * * * *

UNITED STATES PATENT AND TRADEMARK OFFICE
CERTIFICATE OF CORRECTION

PATENT NO. : 6,737,012 B2
DATED : May 18, 2004
INVENTOR(S) : Nakano et al.

It is certified that error appears in the above-identified patent and that said Letters Patent is hereby corrected as shown below:

<u>Title page, Item [54] and Column 1, lines 1-4,</u>
Title, should read -- A METHOD FOR PRODUCING A POWDER FOR MAGNETIC FERRITE --

Signed and Sealed this

Thirtieth Day of November, 2004

JON W. DUDAS
*Director of the United States Patent and Trademark Office*